Oct. 16, 1962  G. W. COPE  3,058,751
DUST GUARD
Filed May 4, 1959  2 Sheets-Sheet 1
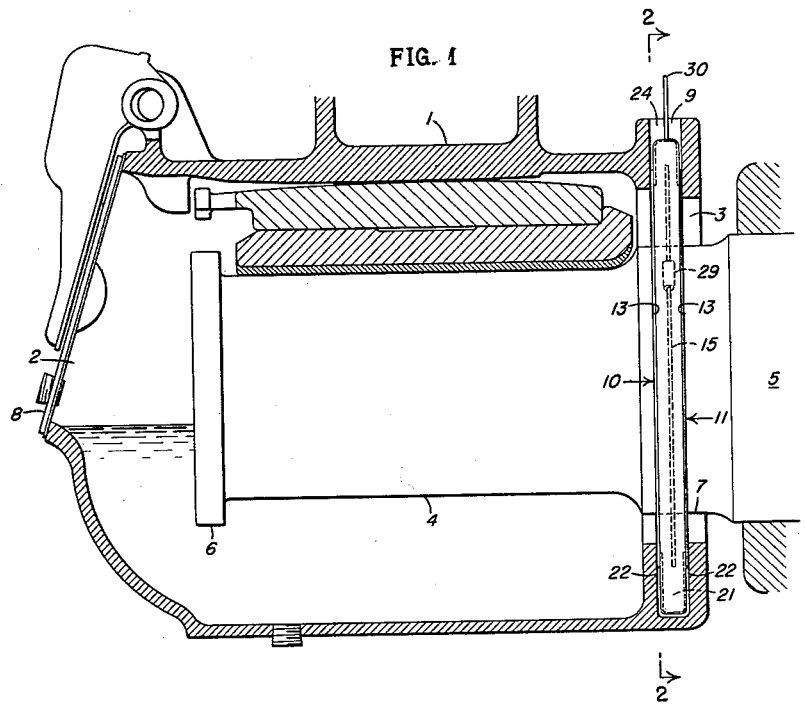
FIG. 1
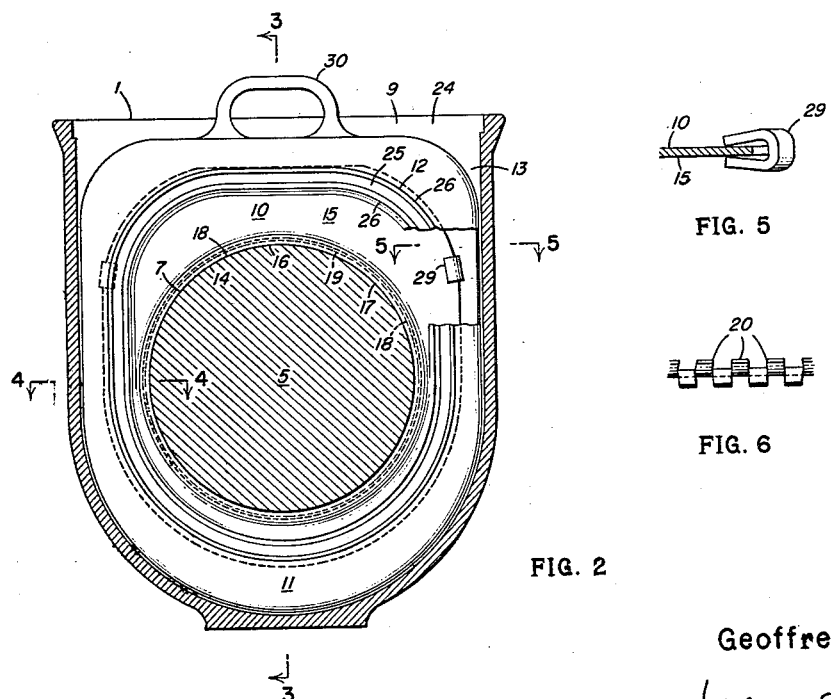
FIG. 2
FIG. 5
FIG. 6
Inventor:
Geoffrey W. Cope
By Wilmer Mechlin
his Attorney Oct. 16, 1962   G. W. COPE   3,058,751
DUST GUARD
Filed May 4, 1959   2 Sheets-Sheet 2
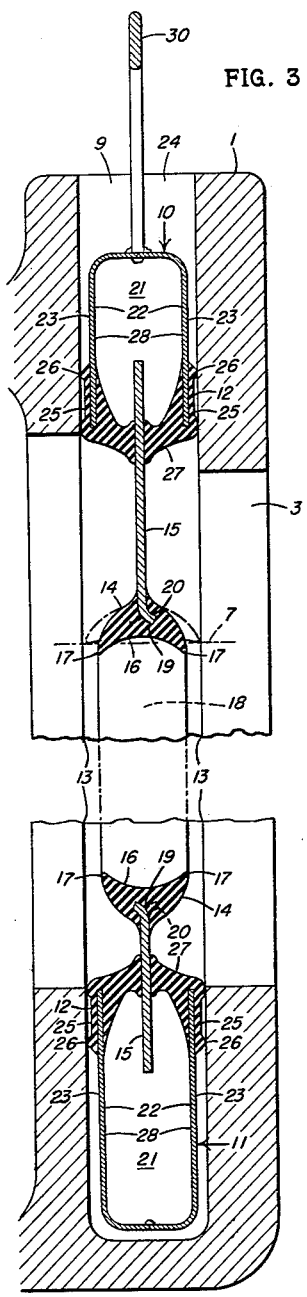
FIG. 3
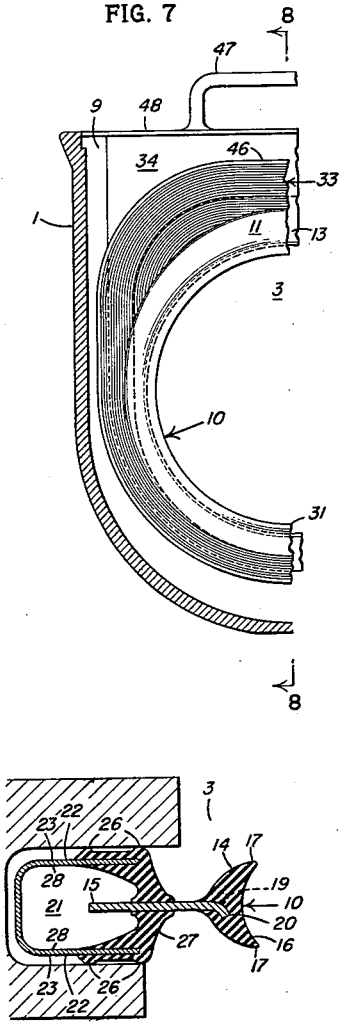
FIG. 7
FIG. 4
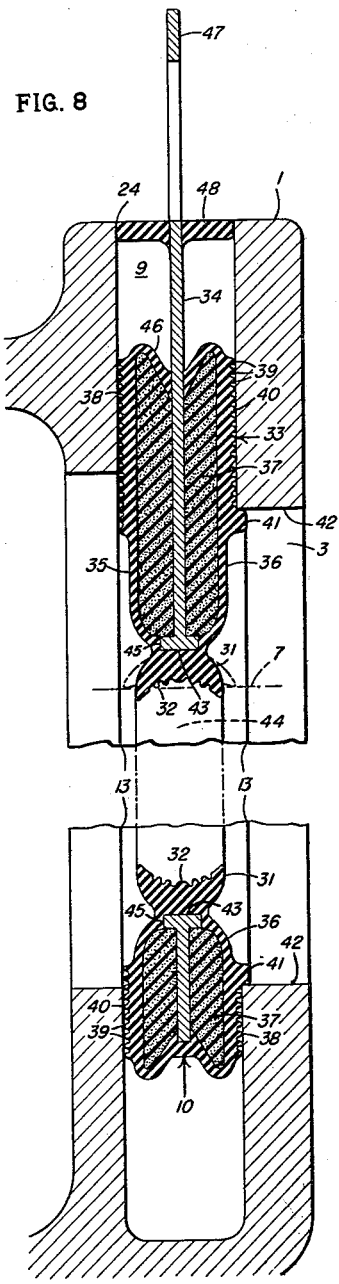
FIG. 8
Inventor:
Geoffrey W. Cope
By Wilmer Mechlin
his Attorney.

United States Patent Office 3,058,751
Patented Oct. 16, 1962

3,058,751
DUST GUARD
Geoffrey W. Cope, Williamsville, N.Y., assignor to Symington Wayne Corporation, Salisbury, Md., a corporation of Maryland
Filed May 4, 1959, Ser. No. 810,943
13 Claims. (Cl. 277—10)

This invention relates to dust guards for journal boxes and has for its primary object the provision of an improved dust guard for sealing the rear opening in a journal box.

Another object of the invention is to provide a dust guard having a journal box-engaging portion and an axle-engaging portion adapted, respectively, to be fixed to and float in the journal box, thereby accommodating itself to any axial and radial displacement of the axle relative to the journal box while inhibiting wear on the latter.

An additional object of the invention is to provide a dust guard wherein the element engaging the axle is flexible and backed by a surrounding rigid element which in turn is flexibly connected to and retractable within a body portion adapted to be secured against movement to the journal box, whereby, without relative movement between the body portion and the journal box, the flexible element is enabled to move and maintain its sealing contact with the axle on radial displacement of the latter relative to the journal box.

A further object of the invention is to provide a dust guard in which a flexible, axle-engaging element not only is rigidly backed, but has a concave, axle-confronting surface on which are formed a plurality of axially spaced lips engageable with the axle and urging thereagainst by the resilience of the sealing element, thus ensuring sealing contact with the axle at all times and with a minimum resistance to the axle's rotation.

Another object of the invention is to provide a dust guard wherein a flexible, axle-engagingg element backed by a surrounding rigid element is normally centered on the axle-receiving rear opening in the journal box and between the sides of the dust guard well therein by resilient means embracing the backing element and frictionally engaging the sides of the well and, so centered, is prevented from being pinched between the axle and walls of the journal box bounding the opening by being of less width than the well.

Other objects and advantages of the invention will appear hereinafter in the detailed description, be particularly pointed out in the appended claims and be illustrated in the accompanying drawings, in which:

FIGURE 1 is a central vertical sectional view of a journal box to which has been applied an embodiment of the dust guard of the present invention, the seal being shown in elevation;

FIGURE 2 is a vertical sectional view taken along the lines 2—2 of FIGURE 1;

FIGURE 3 is a fragmentary vertical sectional view on an enlarged scale taken along the lines 3—3 of FIGURE 2;

FIGURE 4 is a fragmentary vertical sectional view on the scale of FIGURE 3 taken along the lines 4—4 of FIGURE 2;

FIGURE 5 is a fragmentary horizontal sectional view on an enlarged scale taken along the lines 5—5 of FIGURE 2;

FIGURE 6 is a fragmentary view on the scale of FIGURE 5 showing from within the serrated inner edge of the rigid backing plate of the preceding figures;

FIGURE 7 is a fragmentary vertical sectional view on the same scale and taken on the same plane as FIGURE 2 but wtih a different embodiment of the dust guard applied to the journal box; and FIGURE 8 is a fragmentary vertical sectional view on the scale of FIGURE 3 and taken along the lines 8—8 of FIGURE 7.

Referring now in detail to the drawings, in which like reference characters designate like parts, the dust guard of the present invention is adapted primarily to a railway journal box 1, the exemplary form of which shown in FIGURE 1 has a front or access opening 2 and a rear, axle-receiving opening 3 through which is inserted a journal 4 at one end of an axle 5. The illustrated portion of the axle 5 has at opposite ends of the journal 4 the usual thrust collar 6 and dust guard seat 7. Also conventionally, the journal box has its access opening 2 closed by a suitable journal box lid 8 and has formed in it about its rear opening 3 an upwardly opening dust guard well 9. It is in the well 9 that the dust guard 10 of this invention is adapted to seat and there seal the rear opening 3 against escape of oil or entrance of foreign matter about the axle 5.

Essentially, the dust guard 10 of this invention has three main elements, one a body or body portion or member 11 seating or fitting in the well 9 about the rear opening 3 and normally held, fixed or secured against movement by "Neoprene" or like resilient, oil-resistant rubber means 12 carried by or forming part of the body portion and frictionally gripping the longitudinally or axially spaced sides or side walls 13 of the well. The second of the essential elements is an annular or circular seal or sealing element, members or ring 14, again of "Neoprene" or like rubber, which is adapted to engage and have sealing contact with the dust guard seat 7 on the axle 5, and the third is a rigid backing member or plate 15 surrounding or encircling and backing the sealing elements and yieldably or flexibly connected to the body portion 11.

Incorporating the above essentials, the illustrated embodiments differ in detail and will now be described separately, beginning with that of FIGURES 1-6. In this first embodiment, the annular flexible or resilient rubber or like sealing element 14 is crescent-shaped in cross-section and has an inner or dust guard seat-confronting face or rim 16 which, instead of being straight axially, is concave radially and bounded at the sides by a pair of axially or transversely spaced, outwardly and thus substantially oppositely directed lips 17. The concavity or curvature of the inner face 16 is made such that its diameter at the sides is initially less but at the center is greater than the diameter of the seat 7 on the axle 5, the face, when applied to the seat, thus at the sides or edges engaging or contacting and being flattened by the seat but at the center retaining its concavity and being spaced from the seat, at least in the normal or centered position of the axle relative to the rear opening 3 in the journal box 1. The sealing element 14 being unbacked at its sides, as will hereafter be explained, the pressure exerted by that element on the axle 5 is a function of the resilience of the element itself, rendering it simple to ensure that the contact between the sealing element and the seat 7, while constant and under sufficient pressure to prevent loss of oil or entry of foreign matter, imposes a minimum resistance to rotation of the axle. Not only is wear of both the sealing element 14 and the axle 5 correspondingly minimized, but the axial spacing and opposite facing of the lips 17 provides a double or plural seal which is effective in sealing against the pumping action of the axle as it moves or is displaced axially relative to the journal box 1.

Surrounding or encircling the sealing element 14 and centered axially thereon, is the rigid backing element or member 15, here in the form of an annular plate or disc generally flat and extending or disposed radially of the sealing element. The backing plate 15 has a circular central aperture 18 of a diameter at least greater than the maximum inside diameter of the sealing element and about that opening is bonded to the sealing element with its inner edge or periphery 19 either at the back of or, as in this embodiment, embedded in the sealing element. Aligning the sealing element radially or laterally with the well 9, the backing plate 15, to improve its performance of this function, preferably is of increased width or spread about its inner edge 19 so as to be somewhat T-shaped in cross-section, this conveniently being accomplished by so serrating the inner edge as to provide it with alternating, oppositely facing teeth 20.

The backing plate 15 preferably is not restricted in radial dimension or extent to the rear opening 3 in the journal box 1, but projects or extends radially outwardly therefrom into the dust guard well 9 thereabout and, in this first embodiment, projects or extends circumferentially into an inwardly opening channel or groove 21 of greater width and radial extent than the plate and formed between axially or transversely spaced legs 22 of a substantially U-section casing forming the body or journal box-engaging portion or member 11 of the dust guard 10. Rigid and made of metal or other suitable material, the casing 11 is of less width than the well 9 and preferably of a radial extent or dimension to be contained or seat therein about the rear opening 3.

Designed to be held, fixed or secured against movement in the well 9 in the installed position of the dust guard 10, the casing 11 is so held by the aforementioned rubber or like gripping means 12 which here are bonded to the outer sides 23 of the legs 22 confronting the sides or side walls 13 of the well 9, the gripping means, for better gripping of the side walls and sealing against entry of foreign matter into the journal box 1 through the mouth or access opening 24 at the upper end of the well, having their outer or side wall-confronting surfaces 25 annularly ribbed or ridged as at 26. In this embodiment, each of the rubber gripping means 12 conveniently is formed integrally with one piece or part of a two-piece flexible rubber or like diaphragm 27, the pieces embracing and engaging and, if desired, being bonded to opposite sides of the backing plate 15 preferably intermediate the latter's radial extremities and being counterpart so as to center the backing plate on or in the channel 21.

If it is bonded to the backing plate 15, the diaphragm 27 will normally center the sealing element 14 fixed to and carried by the backing plate, both radially and axially relative to the axle-receiving rear opening 3 and, of course, must be of sufficient flexibility or yieldability to enable the backing plate to give to and so accommodate any radial, lateral or transverse displacement or movement of the axle 5 by retracting or telescoping into the portion of the channel 21 in the body member 11 toward which the axle is being displaced. However, if, instead of being bonded, the diaphragm merely slidably engages the backing plate, it need not yield radially with the backing plate but must grip the latter with pressure sufficient to prevent the passage of foreign matter therebetween. To give it sufficient bulk for this purpose, the diaphragm 27 is filleted so as to straddle or embrace each of the legs 22 and, also, preferably is bonded to the inner sides 28 as well as the outer sides 23 of the legs, the former being facilitated by intially forming the casing in two substantially counterpart parts and welding these parts together after bonding of the diaphragm to the legs. The action of the diaphragm 71 in centering the sealing element axially of the well 9 may be supplemented by clips 29 clamped to and spaced about the outer edge of the backing member 15 and riding in the chamber 21. For ready insertion into and removal from the well 9, the dust guard of this embodiment has a handle 30 fixed as by welding to the outer periphery of its casing 11 and, on installation of the dust guard in the well, projecting or extending above the latter's mouth 24.

Incorporating the same essentials as that of FIGURES 1–6, the embodiment of FIGURES 7 and 8 is identical in its sealing element 31 with that of the first embodiment, with two exceptions. One is that its inner face 32, instead of being smooth, is circumferentially ridged, grooved or serrated so as, on engagement with the dust guard seat 7 on the axle 5, to have a multiplicity rather than a plurality of axially spaced seals in line contact therewith.

The other is that, instead of being spaced from and connected to the body member 33 by the backing member 34, the sealing element 31 of this embodiment is molded or otherwise formed integrally with the body member.

As the above relationship imports, the body or body portion or member 33 of the second embodiment is formed at least in part of "neoprene" or like rubber of the same consistency and characteristics as the sealing element 31. This would pose a problem were the body member, the sealing element and the linking or connecting intermediate or intervening rubber portions 35, forming an extension of the body member, of homogeneous consistency since it would be difficult if not impossible to obtain in any given rubber the degree of flexibility required in the sealing element and the yieldability required between the sealing element and the body member so that the former could move radially with the axle 5, while the latter remained fixed to the journal box 1. This problem is here solved by limiting the homogeneity of the body and connecting portions 33 and 35 with the sealing element 31, to a relatively thin sheath or casing 36 and filling the sheath with or molding it about a relatively soft, more yieldable core or filler 37 of "neoprene" or like rubber foam or sponge.

Harder and tougher than the core 37 filling its interior, the sheath 36 protects the core from wear and over its upper part, forming the outer layer or skin of the body member, incorporates or includes at the sides of the rubber gripping means 38 by which the body member is held or fixed against movement to the journal box 1. Each of the gripping and sealing surfaces 39 of the gripping means 38 confronting the side walls 13 of the dust guard well 9 is serrated or notched to provide it with a plurality and preferably a multiplicity of radially spaced, annular sealing edges 40 for better gripping and sealing. Also, in this embodiment, the gripping means 38 at at least one side of the body member 33 is bounded below its gripping surface 39 by an integral, axially outstanding positioning flange or abutment 41 conforming in contour to and adapted to underlie and engage an inner wall 42 on the journal box 1 bounding the rear opening 3 at the corresponding side of the well.

The remaining essential element, the rigid backing member 34, differs from that of the first embodiment both in its form and in its relation to the other elements. Centered axially on and bonded along its inner edge 43 defining its central aperture 44 to the back of the sealing element 31 and with that edge preferably widened, here by an integral cross-bar 45, the consequently T-section backing plate 34 is bonded to and extends centrally through the core 37 into the well 9 and, therewithin, is bonded to the inturned upper end portion 46 of the sheath 36 covering the upper end of the core.

In the main embedded or encased in rubber within resilient connecting and body portions 35 and 33, and normally centered thereby between the side walls 13 of the well 9, the backing member 34 of this second embodiment projects or extends above the body member 33 and, thereabove, has or carries a handle 47 fixed to or formed integrally with it and in turn projecting or extending above the wall 9 in the installed position of the dust guard. To prevent foreign matter from accumulating in the well 9 above the body member 33, the backing plate 34 may carry a resilient or flexible rubber cap or plug 48 adapted to close the mouth 24 of the well, and conveniently bonded to the plate.

Constructed in accordance with either of the foregoing embodiments, the dust guard 10 of this invention is installed through the mouth 24 of the dust guard well 9 and its sealing element 14 or 31, temporarily expanded if necessary by a tube sleeve (not shown), is slid from the outer end of the axle 5 onto the dust guard seat 7 thereon as the axle is inserted into the journal box 1 through the rear opening 3. Once in place and with the tube sleeve, if used, removed, the dust guard, with its sealing element 14 or 31 engaging the axle, its body portion 11 or 33 secured by the gripping means 12 or 38 in the well 9 and the space therebetween closed by the backing plate 15 or 34, alone or, in the case of the second embodiment, in conjunction with the resilient connecting portion 35, will completely seal the interior of the journal box 1 at the rear by closing both the rear opening 3 about the axle 5 and the mouth 24 of the well 9.

Readily obtainable when the axle is centered on the rear opening 3, the sealing afforded by the dust guard of this invention will be maintained over the range of axial and radial movement or displacement of the axle 5 relative to the journal box. On axial and slight radial displacement of the axle, the crescent-shaped sealing element 14 or 31 acts alone in sealing about the axle, its concave, axle-confronting face 16 or 32 maintaining substantially its flexure on initial application on axial displacement of the axle, and on slight axial displacement of the axle, flattening at the side toward which the axle is moving and expanding or extending at the opposite side so as to maintain sealing contact.

Serving thus far principally to center the sealing element 14 or 31 axially, laterally or width-wise of the well 9, and, in the first embodiment, to close the space between the sealing element and the body member 11, the backing plate 15 performs its principal function when the radial displacement of the axle 5 relative to the journal box 1 is of such order as otherwise to pull the seat 7 at one side away from the sealing element. Surrounding the sealing element 14 or 31 at that juncture, the backing plate 15 or 34, due to its encirclement of the sealing element, prevents further distortion of one side of the element independently of the other and, by itself giving to the radial force exerted by the axle 5, causes the sealing element to move as a whole radially with the axle. Guided and centered on the well 9 by the backing plate 15, the sealing element, if the lateral displacement of the axle is excessive, will continue to shift as a whole with the axis to the point at which the latter engages the journal box 1 about the rear opening 3. To prevent damage to it, the sealing element of each embodiment is made narrower than the well 9 so as to be able to withdraw into the latter on such excessive radial shifting of the axle rather than being pinched between the axle and the journal box.

As a corollary of the differences in their structure, the dust guards of the two embodiments differ somewhat in their actions. Their sealing elements 14 and 31 act in exactly the same way over the range of relative displacement of the axle 5 and journal box 1. However, their backing plates 15 and 34, while cooperating in the same fashion with their sealing elements, yield differently under the radial force of the axle, that of the first embodiment utilizing the yieldability of its flexible diaphragm 27 spacing it from the body portion 11 to enable it to retract at one side or another into the channel 21 in the body member 11, while in the case of the second embodiment, the rubber about the backing plate 34 in the connecting portion 35 is in compression and shear and in the body portion 33 is mainly in shear as it yields to enable the backing plate to retract at one side or another into the well 9.

From the above detailed description, it will be apparent that there has been provided an improved dust guard which effectively seals a journal box at the rear over the entire range of relative displacement of the journal box and axle. It should be understood that the described and disclosed embodiments are merely exemplary of the invention and that all modifications are intended to be included which do not depart from either the spirit of the invention or the scope of the appended claims.

Having described my invention, I claim:

1. A journal box dust guard comprising rigid body means fittable in a well in a journal box about an axle-receiving opening therein, resilient means at sides of said body means and engageable with sides of said well for holding said body means against movement in said well, annular flexible means having a plurality of axially spaced lips sealingly engageable with an axle in said opening, rigid mens, backing said flexible means and resilient means carried by said body means and yieldably connecting said rigid means thereto for enabling said flexible means to move radially with said axle relative to said journal box.

2. A journal box dust guard comprising body means securable against movement in a well in a journal box about an axle-receiving opening therein, a flexible crescent-shaped sealing ring narrower than said well and adapted to surround and sealingly engage an axle in said opening, a concave axle-confronting face on said flexible means having a free diameter at the sides less and at the center greater than the diameter of a seat therefor on said axle, rigid means centrally backing said flexible ring, and resilient means carried by said body means and yieldably connecting said ring thereto for centering said ring axially on said well and enabling said flexible ring to move radially with said axle relative to said journal box.

3. A journal box dust guard comprising rigid body means fittable in a well in a journal box about an axle-receiving opening therein, means carried by said body means and engageable with sides of said well for holding said body means against movement in said journal box, flexible means sealingly engageable with an axle in said opening, rigid means backing said flexible means and resilient means carried by said body means and yieldably connecting said rigid means thereto for enabling said flexible means to move radially with said axle relative to said journal box.

4. A journal box dust guard comprising rigid body means fittable in a well in a journal box about an axle-receiving opening therein, resilient means carried by said body means and frictionally engageable with sides of said well for holding said body means against movement in said journal box, flexible means sealingly engageable with an axle in said opening, rigid means backing said flexible means, and resilient means carried by said body means and yieldably connecting said rigid means thereto for enabling said flexible means to move radially with said axle relative to said journal box.

5. A journal box dust guard comprising body means, flexible ribs at sides of said body means and sealingly engageable with sides of a well in a journal box about an axle-receiving opening therein for securing said body means against movement in said well, flexible means sealingly engageable with an axle in said opening, rigid means backing said flexible means and extending radially therefrom into said body means, and resilient means carried by said body means and yieldably connecting said rigid means thereto for enabling said flexible means to move radially with said axle relative to said journal box.

6. A journal box dust guard comprising rigid body means securable against movement in a well in a journal box about an axle-receiving opening therein, flexible means sealingly engageable with an axle in said opening, rigid means backing said flexible means and extending radially therefrom into said body means, and resilient means carried by said body means and yieldably connecting said rigid backing means thereto, said rigid backing means on a predetermined transverse displacement of said axle yielding thereto into said well and causing said flexible means to move radially with said axle relative to said journal box.

7. A journal box dust guard comprising body means securable against movement in and fittable circumferentially within an upwardly opening well in a journal box about an axle-receiving opening therein, flexible means sealingly engageable with an axle in said opening, rigid means backing said flexible means, resilient means carried by said body means and yieldably connecting said rigid means thereto for enabling said flexible means to move radially with said axle relative to said journal box, and handle means secured to said body means and projecting upwardly therefrom above said journal box on installation of said dust guard therein.

8. A journal box dust guard comprising body means securable against movement in a well in a journal box about an axle-receiving opening therein, a flexible sealing ring narrower than said well and sealingly engageable with an axle in said opening, rigid means centrally backing said flexible ring, and resilient means carried by said body means and yieldably connecting said ring thereto substantially midway of sides thereof for enabling said flexible means to move radially with said axle relative to said journal box while resisting relative axial movement of said ring and journal box.

9. A journal box dust guard comprising a rigid annular body member of inwardly opening U-section and fittable into a well in a journal box about an axle-receiving opening therein, resilient means carried by said body member and frictionally engageable with sides of said well for securing said member against movement therein, a flexible sealing ring spaced inwardly from said body member and sealingly engageable with an axle in said opening, a centrally apertured rigid plate connected about the aperture therein to and backing said ring, said plate projecting radially from said ring into said body member, and a rubber diaphragm carried by said body member and yieldably connecting and normally spacing said plate and body member.

10. A journal box dust guard comprising a rigid annular body member fittable into a well in a journal box about an axle-receiving opening therein, resilient means carried by said body member and frictionally engageable with sides of said well for securing said member against movement therein, a flexible sealing ring spaced inwardly from said body member and sealingly engageable with an axle in said opening, a centrally apertured rigid plate connected about the aperture therein to and backing said ring, said plate projecting radially from said ring into an inwardly opening channel of relatively greater radial and axial dimensions in said body member, and a rubber diaphragm carried by said body member and yieldably connecting and normally spacing said plate and body member.

11. A journal box dust guard comprising a rigid annular body member fitttable into a well in a journal box about an axle-receiving opening therein, resilient means carried by said body member and frictionally engageable with sides of said well for securing said member against movement therein, a flexible crescent-shaped sealing ring narrower than said well spaced inwardly from said body member and sealingly engageable with an axle in said opening, a centrally apertured rigid plate connected about the aperture therein to and backing said ring, said plate projecting radially from said ring into an inwardly opening channel of relatively greater radial and axial dimensions in said body member, and a rubber diaphragm carried by said body member and yieldably connecting and normally spacing said plate and body member.

12. A journal box dust guard comprising an initially axially split rigid annular body member fittable into a well in a journal box about an axle-receiving opening therein, resilient means carried by said body member and frictionally engageable with sides of said well for securing said member against movement therein, a flexible sealing ring spaced inwardly from said body member and sealingly engageable with an axle in said opening, a centrally apertured rigid plate connected about the aperture therein to and backing said ring, said plate projecting radially from said ring into an inwardly opening channel of relatively greater radial and axial dimensions in said body member, and a rubber diaphragm carried by said body member and yieldably connecting and normally spacing said plate and body member.

13. A journal box dust guard comprising a flexible rubber sealing ring containable within an axle-receiving opening in a journal box and sealingly engageable with an axle therein, a rubber body portion securable against movement in a well in said journal box about said opening, a rubber connection between said ring and body portion, said body portion and connection having a common sheath and relatively soft core, and a radially extending rigid plate embedded in said body portion and connection and having an inner edge surrounding and backing said ring.

References Cited in the file of this patent
UNITED STATES PATENTS

| | | |
|---|---|---|
| 2,241,870 | Scribner | May 13, 1941 |
| 2,257,119 | Johannesen | Sept. 30, 1941 |
| 2,657,080 | Johnson et al. | Oct. 27, 1953 |
| 2,758,853 | Beck | Aug. 14, 1956 |
| 2,826,441 | Niessen | Mar. 11, 1958 |
| 2,960,355 | Bayerl | Nov. 15, 1960 |